(12) United States Patent
Ishikawa et al.

(10) Patent No.: US 6,598,508 B1
(45) Date of Patent: Jul. 29, 2003

(54) OPTICAL FIBER CUTTING DEVICE

(75) Inventors: Ryuichi Ishikawa, Toyohashi (JP);
Kyosuke Harada, Toyohashi (JP);
Taichi Masuda, Sakura (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/450,785

(22) Filed: Nov. 30, 1999

Related U.S. Application Data

(62) Division of application No. 09/160,581, filed on Sep. 25, 1998.

(51) Int. Cl.$^7$ ................................................. B26D 5/08
(52) U.S. Cl. ............................. 83/613; 83/628; 83/950
(58) Field of Search ........................... 83/613–641, 950, 83/318, 337, 646; 81/628, 9.51; 225/96.2, 96, 2, 93; 29/564.4, 566.3

(56) References Cited

U.S. PATENT DOCUMENTS

| | | | |
|---|---|---|---|
| 2,454,241 A | | 11/1948 | Wennerberg ................. 83/355 |
| 2,563,986 A | | 8/1951 | Bauer ............................. 83/24 |
| 3,783,726 A | * | 1/1974 | Marks ........................ 83/355 |
| 4,230,010 A | * | 10/1980 | Guenthner ................... 83/600 |
| 4,267,636 A | * | 5/1981 | Ducret ....................... 30/90.3 |
| 4,474,319 A | | 10/1984 | Walker ...................... 225/96.5 |
| 4,530,452 A | | 7/1985 | Balyasany et al. ............. 225/96 |
| 4,534,254 A | * | 8/1985 | Budzich et al. ............ 83/425.2 |
| 4,699,027 A | * | 10/1987 | Guyette et al. .............. 81/9.51 |
| 4,741,234 A | * | 5/1988 | Colombo .................... 83/481 |
| 4,790,465 A | * | 12/1988 | Fellows et al. ................ 225/2 |
| 4,796,491 A | * | 1/1989 | Klaussner .................. 81/9.51 |
| 4,852,244 A | * | 8/1989 | Lukas ........................ 29/566.3 |
| 5,070,615 A | * | 12/1991 | Michael, III ................. 30/90.8 |
| 5,105,702 A | * | 4/1992 | Fara ............................. 83/425 |
| 5,193,276 A | * | 3/1993 | Konig et al. ................. 30/90.1 |
| 5,361,663 A | | 11/1994 | Hayes et al. ............. 83/522.19 |
| 5,850,773 A | | 12/1998 | Burns ........................... 83/159 |
| 5,896,786 A | * | 4/1999 | Akita ......................... 81/9.41 |
| 6,148,708 A | * | 11/2000 | Pfeiffer ....................... 83/628 |
| 2002/0038593 A1 | * | 4/2002 | Ishikawa et al. ............. 83/628 |

FOREIGN PATENT DOCUMENTS

| | | | | |
|---|---|---|---|---|
| EP | 2070494 A | * | 2/1981 | ................ 83/303 |
| JP | 62-15762 | | 4/1987 | |
| JP | 62-57001 | | 11/1987 | |
| JP | 5-75703 | | 10/1993 | |
| JP | 6262591 | * | 9/1994 | ................ 83/649 |
| JP | 7-26802 | | 5/1995 | |
| JP | 10-273334 | * | 10/1998 | |

* cited by examiner

*Primary Examiner*—Carl J. Arbes
*Assistant Examiner*—Minh Trinh
(74) *Attorney, Agent, or Firm*—Oblon, Spivak, McClelland, Maier & Neustadt, P.C.

(57) ABSTRACT

An optical fiber cutting device provided with a speed reducing part which transmits drive force by reducing the drive speed of the external drive force, a drive force transmission part which transmits the drive force from the speed reduction part to the cutting blade holder, a cutting blade holder, a cutting blade which is held by the cutting blade holder and moves to the cutting position along with said cutting blade holder, and an optical fiber supporter which supports the optical fiber so as to be perpendicular to said cutting blade at the cutting position. In addition, when a cutting blade with a blade thickness $\alpha$ (mm) is used, and said cutting blade is moved at a speed $\beta$ (mm/minute) during cutting, $\alpha$ and $\beta$ fulfill the expression $\beta \leq -253\alpha+65$.

10 Claims, 2 Drawing Sheets

OPTICAL FIBER CUTTING DEVICE

This application is a division of application Ser. No. 09/160,581, filed Sep. 25, 1998.

BACKGROUND OF THE INVENTION

1. Field of the Invention

The present invention relates to an optical fiber cutting device and optical fiber cutting method for smoothly cutting optical fibers

2. Description of the Related Art

Plastic optical fibers (referred to as "optical fibers" hereinbelow) are widely used for optical communication, opto-electric switching, etc. In these areas of usage, optical fibers are connected to other optical fibers and to optical receiving and emitting elements. In this situation, the end surface of the optical fiber must be smooth because the condition of the end surface of the optical fiber influences the transmission loss of the light.

Conventionally, in order to make the end surface of the optical fiber smooth, optical polishing and mirror surface transfer processing are carried out after cutting, as disclosed, for example, in Japanese Patent Application, Second Publication, No. Sho 62-57001 (1987). However, these operations have the drawback that their operability is low.

Thus, devices which omit this kind of end surface smooth processing and, obtain a sufficiently smooth end surface by cutting with the object of improving operability, are disclosed, for example, in Japanese Utility Model, Second Publication. No. Sho 62-15762 and Japanese Utility Model, First Publication, No. Hei 5-75703. The device disclosed in Japanese Utility Model, Second Publication, No. Sho 62-15762, is a cutting device provided with a pair of side walls having insertion holes for supporting the optical fiber and one cutting blade, and obtains a smooth end surface by precisely moving the cutting blade. In the device disclosed in Japanese Utility Model, First Publication. No. Hei 5-75703, a cutting blade with a fan shape set at 30–50°, thereby suppressing damage of the blade.

However, the device in Japanese Utility Model, Second Publication, No. Sho 62-15762 can make the end surface of the optical fiber sufficiently smooth, but it has the drawback that if the cutting blade is thin, the cutting blade will deteriorate easily. In addition, the device disclosed in Japanese Utility Model, First Publication, No. Hei 5-75703 has the drawback that half of the end surface of the optical fiber is in a cleaved state because the cutting weight rapidly decreases after the cutting blade transits the center of the optical fiber.

In addition, a small optical fiber cutting device which can obtain a smooth end surface is disclosed in Japanese Utility Model, First Publication, No. Hei 7-26802. In this cutting device, an optical fiber is clipped and cut by manually rotating on the center of a fulcrum at least one of an optical fiber anchoring member or a blade support member which supports the blade, and between the optical fiber anchoring member and the blade support member, an elastic body such as a spring is used. Because of this, the elastic strength of the elastic body increases as the cutting progresses, and as a result, the speed of the movement of the cutting blade decreases. In addition, the speed of the movement of the cutting blade can be adjusted so as to slow down after completing the cutting of half of the cross-section area of the optical fiber.

However, in this cutting device, the cutting speed depends on the size of the manual force applied at the time of cutting. Thus, the cutting speed is irregular, and stable cutting cannot be carried out. Also, there are the problems that the optical fiber may be cut at an inappropriate cutting speed. Because of the instability or inappropriateness of the cutting speed, the cut surface may be insufficiently smooth.

In summary, up to the present, an optical fiber cutting device and an optical fiber cutting method wherein the cutting blade deteriorates with difficulty and the smooth entire end surface of the optical fiber can be obtained and the optical fiber can be cut stably nave not been proposed.

SUMMARY OF THE INVENTION

The optical fiber cutting device of the present invention provides a speed reduction part which transmits drive force by reducing the drive speed of the external drive force, a drive force transmission part which transmits the drive force from the speed reduction part to the cutting blade holder, a cutting blade holder, a cutting blade which is held by the cutting blade holder and moves with the cutting blade holder to the cutting position, and an optical fiber supporter which holds the optical fiber so as to be perpendicular to the cutting blade at the cutting position.

In addition, if cutting blade having a blade thickness of $\alpha$ (mm) is used, and this cutting blade is moved at a speed of $\beta$ (mm/minute), $\alpha$ and $\beta$ are set so as to fulfill the following expression (1):

$$\beta \leq -253\alpha + 65 \qquad \text{Exp. (1)}$$

In addition, it is further preferable that said drive force be provided by a rotating motor, and that said speed reduction part be a set of speed reduction gears which reduces the rotation speed of the above motor, and further, that said drive force transmission part comprise a cam which rotates along with the rotation of said set of speed reduction gears and a cam follower which moves rectilinearly along with the rotation of said cam.

DESCRIPTION OF THE PREFERRED EMBODIMENTS

Figure 1:
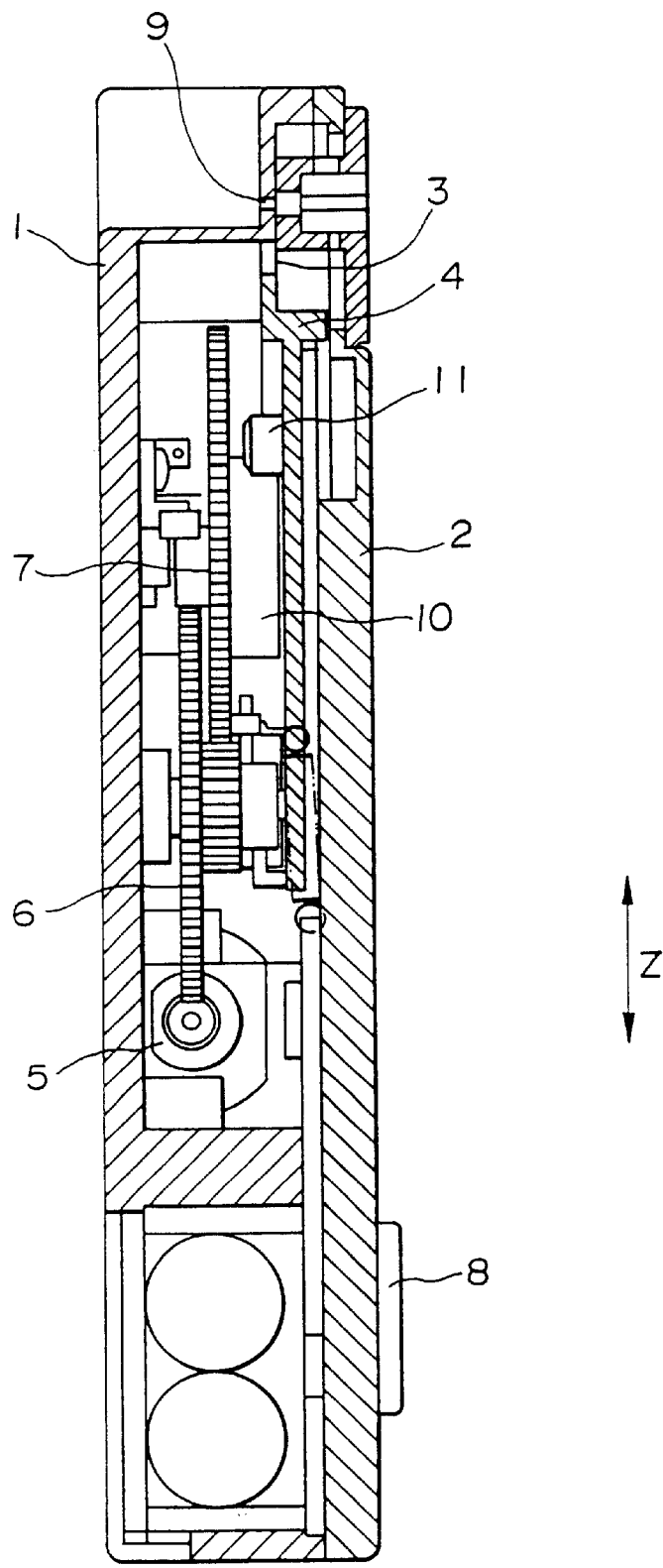
FIG. 1 is a top view of a cross-section of the optical fiber cutting device of the present invention.

In the process of cutting the optical fiber, the cutting blade contacts the circumferential part of the optical fiber and then, because the cutting area increases until the middle, the cutting, weight is increased. After the cutting blade transits the center part of the optical fiber, because, contrarily, the cutting area decreases, the cutting weight is decreased. At this time, if applying the same force as has been necessary in cutting when the cutting blade has arrived at the center, after the cutting blade transits the center, the cutting speed increases because the force per unit of area increases. If the cutting speed becomes too fast, the cut surface of the optical fiber will be in a cleaved state, and will lose its smoothness.

In the present invention, by lowering the speed of the movement of the cutting blade by the speed reduction part, and stopping the acceleration of the cutting blade after it transits the center of the optical fiber, cleaving of the end surface of the cut optical fiber can be prevented, and the stress on the cutting blade during cutting can be decreased. By making the degree of the reduction change depending on the position of the cutting blade in the direction of a diameter of a cross section of the optical fiber, and by using a speed reduction part which can maintain the speed of movement of the cutting blade almost always constant, these effects can be further increased.

Moreover, it is not necessary that the device of the present invention be completely formed in one device, but can comprise an arrangement of a plurality of devices.

It is possible to use, for example, a stainless steel blade as the cutting blade in the present invention. The shape of the cross-section of the cutting blade can have linear sides, as in generally the case, or other shapes, for example, a side with a fan shape. In order to cut the optical fiber as smoothly as possible, the thickness of the blade at the edge of the cutting blade (referred to as the "blade thickness," below) should be as thin as possible, and additionally, the angle formed by both sides of the cutting blade along the edge should be as small as possible. However, as the blade becomes thinner, or as the blade angle gets smaller, the durability (product life) decreases, and thus the blade thickness and blade angle must be determined according to the cost when cutting the optical fiber and the smoothness of the end surface of the optical fiber which is required. In addition, as will be explained later, because the degree of the smoothness of the optical fiber and the deterioration of the cutting blade is influenced by the speed of movement of the cutting blade as well, it is preferable to determine the blade angle and blade thickness taking into account the speed of the movement of the cutting blade. In addition, the smoothness of the end surface of the optical fiber and the durability of the cutting blade are greatly improved by heating the cutting blade during cutting.

As the drive force necessary for cutting, the rotating force of a motor, for example, is representative, but other driving forces, for example, manual driving forces, are possible. The drive speed of this kind of drive force is reduced to the desired speed for cutting the optical fiber by the speed reduction part, and is transmitted to the drive force transmission part. The speed reduction part can be constructed, for example, from an arrangement of gears of differing diameters. In this case, when gears and a cam disposed on the same axis of a gear can be used together, it is possible to control the speed of the movement of the cutting blade with even further accuracy.

In the case of a drive force which does not have a high speed, for example, manual force, as a speed reduction part, it is possible to attain the desired speed by disposing a speed control apparatus, such as a damper or a cam on the part which transmits the drive force.

Moreover, when using manual force as the driving force, the drive speed will vary depending on differences between individuals, and in addition, the same person may change the drive speed between the beginning of the cutting and the end of the cutting. However, in actual practice this problem will not arise because it is possible to make the absolute value of the amount of change in the speed small if the drive speed is reduced at a constant rate.

The drive force transmission part transmits the drive force from the speed reduction part to the cutting blade holder. The cutting blade holder holds the cutting blade, and can move in a predetermined direction. When the direction of the drive force and the direction of the movement of the cutting blade are different, the direction of the force can be changed in the drive force transmission part. For example, in contrast to the output from the speed reduction part which has a circumferential direction, when the cutting blade needs to be moved in a rectilinear direction, a cam and a cam follower which is arranged so as to contact with the cam and moves in a rectilinear direction along with the rotation of the cam are used, and the cutting blade holder is anchored to the cam follower. In this state, by making the cam rotate, the cam presses on the cam follower, and the cutting blade holder moves in the rectilinear direction, the result being that the cutting blade arrives at the cutting position.

The optical fiber supporter anchors the optical fiber perpendicular to the cutting blade in the cutting position so as not to move during cutting. A side wall, for example, which adjoins the cutting blade during cutting is provided, and an optical fiber insertion hole which penetrates in a direction perpendicular to the cutting blade can be provided in this side wall. It is preferable that the optical fiber supporter support the optical fiber on both sides of the blade in order to prevent cleavage of the end surface of the optical fiber and cracking in the axial direction of the optical fiber.

The slower the speed of the movement of the cutting blade is set, the end surface of the optical fiber becomes smooth, and the deterioration of the cutting blade is minimized. However, because when the speed of the movement of the cutting blade is set too slow, naturally the operability decreases, the speed of movement of the cutting blade is set according to the required conditions.

In order to coordinate the smoothness of the end surface of the optical fiber, the degree of deterioration of the cutting blade, and the operability at a sufficiently high level, if the blade thickness is $\alpha$ (mm) and the speed of movement of the cutting blade when cutting the optical fiber is $\beta$ (mm/minute), then it is preferable that $\alpha$ and $\beta$ fulfill the relationship described by Eq. 1. It is further preferable that the blade thickness $\alpha$ be 0.5 mm or less, and that the speed of the movement of the cutting blade $\beta$ be 100 mm/minute or less.

In addition, it is preferable that the speed of the movement of the cutting blade be close to constant from the beginning to the end of the cutting, without being influenced by the change in the cutting weight. When the speed of the cutting changes greatly, undulations may be produced on the cutting surface of the optical fiber due to changes in the direction of movement of the cutting blade.

Below, the present invention is explained in detail according to an embodiment.

Figure 2:
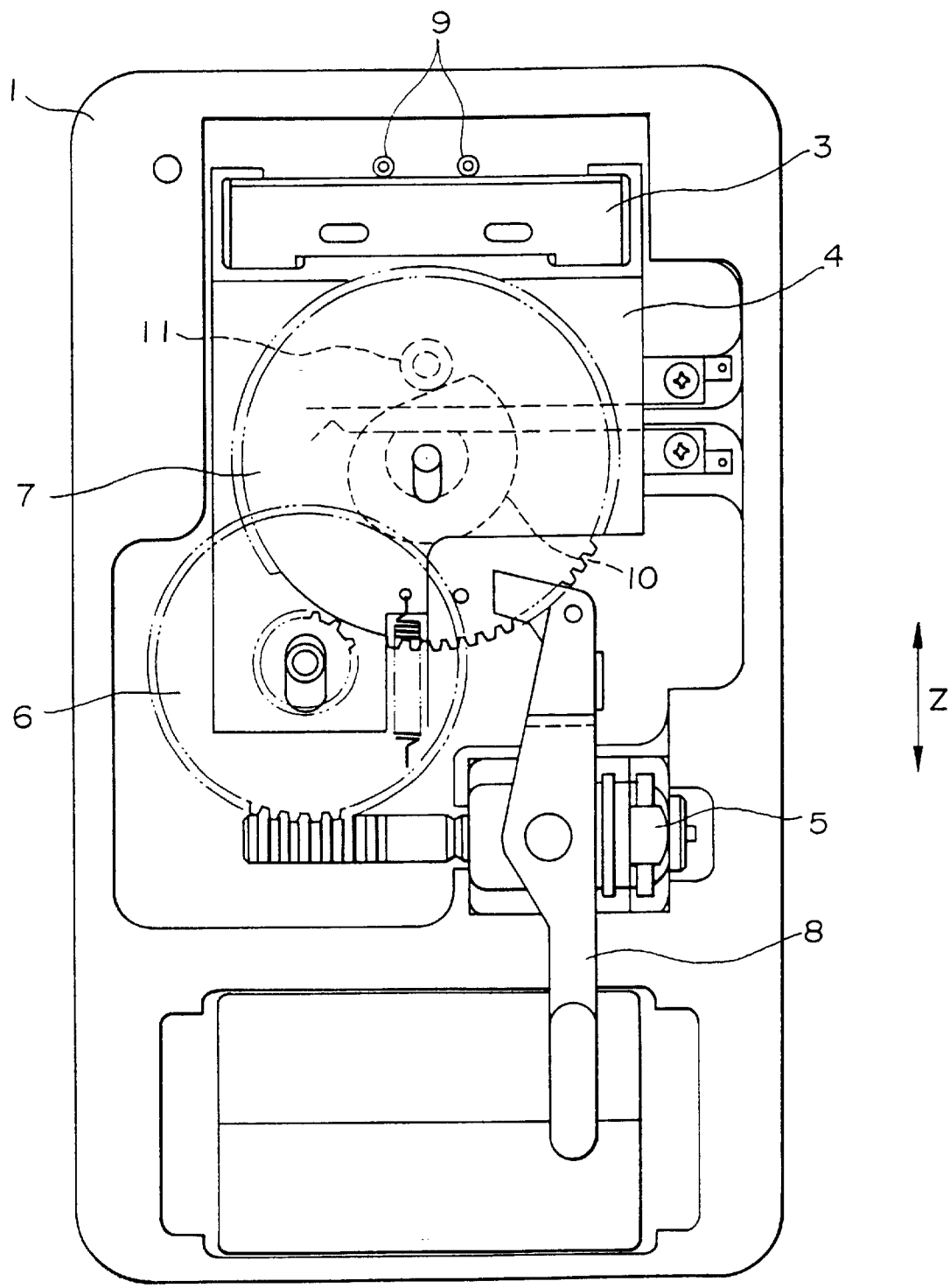
FIG. 2 is a side view of a cross-section of the optical fiber cutting device of the present invention.

FIG. 1 is a top view of a cross-section of an example of the optical fiber cutting device of the present invention, and FIG. 2 is a side view of a cross-section of the example of the optical fiber cutting device of the present invention. Reference numeral 1 is the cutting device body, and 2 is the upper lid. The optical fiber insertion hole (optical fiber supporter) 9 has a diameter about the same size as the diameter of the cross-section of the optical fiber, and because there is sufficient thickness in the direction of the insertion, the inserted optical fiber can be supported so as not to shift during cutting. A slider (cutting blade holder) 4 holds the cutting blade 3. The slider 4 has a structure wherein the cutting blade 3 only moves in the direction of the arrow (the Z direction) along the page surface of FIG. 1 and FIG. 2, and the edge of the blade slides completely across the insertion hole 9.

The trigger lever 8 is maintained in a rotatable stale by making an axis of rotation near the center of the lever. One end of the trigger lever 8 protrudes outside the body, and can be manually manipulated, while the other end is along and in contact with the bottom surface of the speed reduction gear (speed reduction part) 7.

A protrusion is provided protruding on the plane surface on which the end of the speed reduction gear 7 side of the trigger lever 8 moves. When the trigger lever 8 is rotated, the protrusion provided on the speed reduction gear 7 is pushed, and the speed reduction gear 7 is forced to rotate at a predetermined angle. On one part of the circumference of the speed reduction gear 7, gear teeth which mesh with the speed reduction gear (speed reduction part) 6 are provided, and by causing the trigger lever 8 to rotate, the speed reduction gear 6 and the speed reduction gear 7 mesh. In this manner, after the speed reduction gears 6, 7 have meshed, when the switch of the motor 5 is turned on, the drive force of the motor 5 which starts rotating is transmitted to the cam (drive force transmission part) 10 through, in order, the speed reduction gear 6 and speed reduction gear 7 as the speed of the drive force is reduced. The cam 10 is disposed on the same axis as the speed reduction gear 7, and rotates along with the rotation of the speed reduction gear 7. The cam follower (drive force transmission part) 11 contacts the cam 10, and is anchored to the slider 4. The arrangement is such that when the cam 10 rotates, the cam 10 pushes the cam follower 11, and accompanying this, the slider 4 moves in the direction of the arrow (the Z direction) on the surface of the page in FIG. 1 and FIG. 2. Then when the optical fiber is inserted into the insertion hole 9, the optical fiber is cut by the cutting blade 3 held by the slider 4.

Using an apparatus such as the one above, the optical fiber was cut using a cutting blade 3 with a blade thickness of 0.1 mm and a blade angle of 10 degrees.

Then the shape of the cam 10 and the speed reduction ratio of the speed reduction gears 6, 7 are set, based on the number of rotations of the motor 5, and as the speed of the movement of the cutting blade fulfills the conditions of Eq. 1 above from the cutting beginning position to the cutting ending position, in the case of this apparatus, the speed of the movement of the cutting blade 3 is set so as to be 40 mm/minute or less. In addition, during cutting, the speed of the movement of the cutting blade 3 is made almost constant, irrespective of its position.

The end surface of the obtained optical fiber is smooth, the cutting blade 3 endures use more than 100 times, and the deterioration of the cutting blade 3 is small. That is, according to the optical fiber cutting device and cutting method of the present invention, the deterioration of the cutting blade 3 is reduced, and a smooth optical fiber cutting surface is obtained stably.

What is claimed is:

1. An optical fiber cutting device comprising:
    a motor configured to generate a drive force;
    a speed reduction part configured to reduce a drive speed of said drive force;
    a cutting blade holder detachably holding a cutting blade and configured to move in a rectilinear direction sufficiently such that the cutting blade moves through an optical fiber in the rectilinear direction;
    a drive force transmission part configured to transmit the drive force, the drive speed of which has been reduced by the speed reduction part, to the cutting blade holder; and
    an optical fiber supporter which supports the optical fiber so as to be perpendicular to said cutting blade at the cutting position.

2. The optical fiber cutting device according to claim 1, wherein:
    said speed reducing part is connected to a motor and comprises a set of speed reducing gears configured to mesh with each other to reduce rotation speed of said motor; and
    said drive force transmission part comprises a cam positioned to rotate along with a rotation of said set of speed reduction gears and a cam follower positioned to move in a rectilinear direction along with a rotation of said cam.

3. The optical fiber cutting device according to claim 2, further comprising a trigger lever configured to switch transmission/stoppage of said drive force being transmitted between said motor and said drive force transmission part by forcibly rotating one of the speed reducing gears so as to mesh the one of the speed reducing gears to other one of the speed reducing gears.

4. The optical fiber cutting device according to claim 1, wherein said optical fiber supporter supports said optical fiber on both sides of said cutting blade.

5. An optical fiber cutting device comprising:
    a cutting blade having a cutting edge;
    an optical fiber supporter configured to support an optical fiber perpendicularly to said cutting blade at a cutting position;
    a cutting blade holder detachably holding the cutting blade and configured to move in a rectilinear direction toward the cutting position sufficiently such that the cutting edge of the cutting blade moves through the optical fiber in the rectilinear direction;
    a speed reducing part configured to reduce a drive speed of a drive force for driving the cutting blade holder; and
    a drive force transmission part positioned to receive the drive force from the speed reduction part and configured to move the cutting blade holder toward the optical fiber.

6. The optical fiber cutting device according to claim 5, wherein:
    said speed reducing part is connected to a motor and comprises a set of speed reducing gears configured to reduce a rotation speed of said motor; and
    said drive force transmission part comprises a cam positioned to rotate along with a rotation of said set of speed reduction gears and a cam follower positioned to move in a rectilinear direction along with a rotation of said cam.

7. The optical fiber cutting device according to claim 5, further comprising a motor connected to said speed reducing part.

8. The optical fiber cutting device according to claim 7, further comprising a trigger lever configured to turn on said motor and activate said speed reducing part.

9. The optical fiber cutting device according to claim 5, wherein said speed reducing part is set to reduce the drive speed to $\beta$ (mm/minute) when the cutting blade has a blade thickness $\alpha$ (mm), where $0<\beta \leq -253\beta+65$ (mm/minute).

10. An optical fiber cutting device comprising:
    a cutting blade;
    a cutting blade holder detachably holding the cutting blade and move in a rectilinear direction to a cutting potion sufficiently such that a cutting edge of the cutting blade moves through an optical fiber in the rectilinear direction;
    speed reducing means for reducing a drive speed of an external drive force;
    drive force transmitting means for transmitting a drive force from said speed reducing means to the cutting blade holder; and
    optical fiber supporting means for supporting the optical fiber perpendicularly to said cutting blade at the cutting position.

* * * * *